(12) United States Patent
Kairali et al.

(10) Patent No.: US 11,489,939 B1
(45) Date of Patent: Nov. 1, 2022

(54) SMART EGRESS IN SERVICE MESH

(71) Applicant: International Business Machines Corporation, Armonk, NY (US)

(72) Inventors: Sudheesh S. Kairali, Kozhikode (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/569,633

(22) Filed: Jan. 6, 2022

(51) Int. Cl.
*H04L 67/568* (2022.01)

(52) U.S. Cl.
CPC .................. *H04L 67/568* (2022.05)

(58) Field of Classification Search
CPC .... H04L 67/50–67/568; G06Q 30/00–30/0239
See application file for complete search history.

(56) References Cited

U.S. PATENT DOCUMENTS

| | | | | |
|---|---|---|---|---|
| 10,503,553 | B1* | 12/2019 | Ashok | G06F 11/3024 |
| 11,196,643 | B2* | 12/2021 | Bruun | H04L 41/12 |
| 2011/0302569 | A1* | 12/2011 | Kunze | G06F 8/63 |
| | | | | 709/224 |
| 2016/0011904 | A1* | 1/2016 | Kumaresan | G06F 9/485 |
| | | | | 718/102 |
| 2017/0060557 | A1* | 3/2017 | Bendelac | H04L 67/34 |
| 2018/0018572 | A1* | 1/2018 | Wang | G06Q 10/02 |
| 2018/0131764 | A1* | 5/2018 | Suter | G06F 9/547 |
| 2019/0188739 | A1* | 6/2019 | Champaneria | G06Q 30/0202 |
| 2021/0174280 | A1* | 6/2021 | Ratnapuri | H04L 67/51 |
| 2021/0243247 | A1 | 8/2021 | He | |

OTHER PUBLICATIONS

Anonymous. "Egress Gateways." Accessed Sep. 2, 2021. 18 pages. Published by Istio. https://istio.io/latest/docs/tasks/traffic-management/egress/egress-gateway/.
Anonymous. "Method and Process for Enhancing Interdependent Microservices Performance with the Application of Predictive Analysis through Distributed Tracing with Covariance Factor for Cloud Based Storage." Published Oct. 31, 2020 by IP.com. 8 pages. https://ip.com/IPCOM/000264011.
Esparrachiari, et al., "Tracking and Controlling Microservice Dependencies." Published Sep. 11, 2018 by ACM. 18 pages, https://queue.acm.org/detail.cfm?id=3277541.
Feval, Charles. "Search Across Microservices." Published Oct. 9, 2019 by Feval. 11 pages. https://www.feval.ca/posts/search-across-microservices/.
Kitajima, et al., "Inferring Calling Relationship Based on External Observation for Microservice Architecture." Service-Oriented Computing. ICSOC 2017. Lecture Notes in Computer Science, vol. 10601. 9 pages. Springer, Cham, https://doi.org/10.1007/978-3-319-69035-3_16.

(Continued)

*Primary Examiner* — Clayton R Williams
(74) *Attorney, Agent, or Firm* — Jared L. Montanaro

(57) ABSTRACT

A processor may receive a microservice chain. The processor may analyze the microservice chain for one or more microservices in the microservice chain that include deducible information. The processor may trigger, from the deducible information, a deduced microservice. The processor may process the deduced microservice. The processor may cache an outcome from the deduced microservice.

20 Claims, 5 Drawing Sheets

(56) References Cited

OTHER PUBLICATIONS

Mell, et al., "The NIST Definition of Cloud Computing," Recommendations of the National Institute of Standards and Technology, U.S. Department of Commerce, Special Publication 800-145, Sep. 2011, 7 pgs.

Muja, et al., "Scalable Nearest Neighbor Algorithms for High Dimensional Data." In IEEE Transactions on Pattern Analysis and Machine Intelligence. Nov. 2014, pp. 2227-2240, vol. 36. 14 pages. DOI Bookmark: 10.1109/TPAMI.2014.2321376.

Ross, Bill. "Microservices dependency mapping: breaking free from your monolith." Published Sep. 25, 2018 by Headspring. 6 pages. https://headspring.com/2018/09/25/analyzing-and-resolving-dependencies-to-free-microservices-from-a-monolith/.

Samet, Hanan. "Foundations of Multidimensional and Metric Data Structures." 2005. Morgan Kaumann Publishers Inc., San Francisco, CA, USA. Abstract Only. 7 pages. https://dl.acm.org/doi/book/10.5555/1076819.

Weber, et al., "A Quantitative Analysis and Performance Study for Similarity-Search Methods in High-Dimensional Spaces." In VLDB '98: Proceedings of the 24rd International Conference on Very Large Data Bases. Aug. 1998 pp. 194-205. 3 pages. Abstract Only. https://dl.acm.org/doi/10.5555/645924.671192.

Wikipedia, "k-d tree." Last edited Sep. 10, 2021. 11 pages. Published by Wikipedia. https://en.wikipedia.org/wiki/K-d_tree.

Wikipedia. "Metric tree." Last edited Jan. 19, 2021. 2 pages. Published by Wikipedia, https://en.wikipedia.org/wiki/Metric_tree.

Wikipedia. "M-tree." Last edited May 31, 2021. 5 pages. Published by Wikipedia. https://en.wikipedia.org/wiki/M-tree.

Wikipedia. "Quadtree." Last edited Oct. 15, 2021. 13 pages. Published by Wikipedia. https://en.wikipedia.org/wiki/Quadtree.

Wikipedia. "R* tree." Last edited Jun. 9, 2021. 5 pages. Published by Wikipedia. https://en.wikipedia.org/wiki/R*_tree.

Wikipedia. "R+tree." Last edited Mar. 12, 2020. 2 pages. Published by Wikipedia. https://en.wikipedia.org/wiki/R%2B_tree.

Wikipedia. "R-tree." Last edited Aug. 18, 2021. 6 pages. Published by Wikipedia. https://en.wikipedia.org/wiki/R-tree.

Wikipedia. "Similarity search." Last edited Aug. 12, 2021. 3 pages. Published by Wikipedia. https://en.wikipedia.org/wiki/Similarity_search.

Wikipedia. "X-tree." Last edited Aug. 26, 2021. 1 page. Published by Wikipedia. https://en.wikipedia.org/wiki/X-tree.

* cited by examiner

US 11,489,939 B1

SMART EGRESS IN SERVICE MESH

BACKGROUND

The present disclosure relates generally to the field of cloud-based solutions, and more specifically to smart egress in service mesh via deducibility cache built based on similarity searches within microservice chains.

Microservice chains are one of the most evolving technical items in cloud-based solutions. A service mesh may be a form of a microservice chain in a controlled environment where each microservice in the chain has a proxy that can communicate with other microservices in the chain as well as with a control plane.

SUMMARY

Embodiments of the present disclosure include a method, computer program product, and system for smart egress in service mesh. A processor may receive a microservice chain. The processor may analyze the microservice chain for one or more microservices in the microservice chain that include deducible information. The processor may trigger, from the deducible information, a deduced microservice. The processor may process the deduced microservice. The processor may cache an outcome from the deduced microservice.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
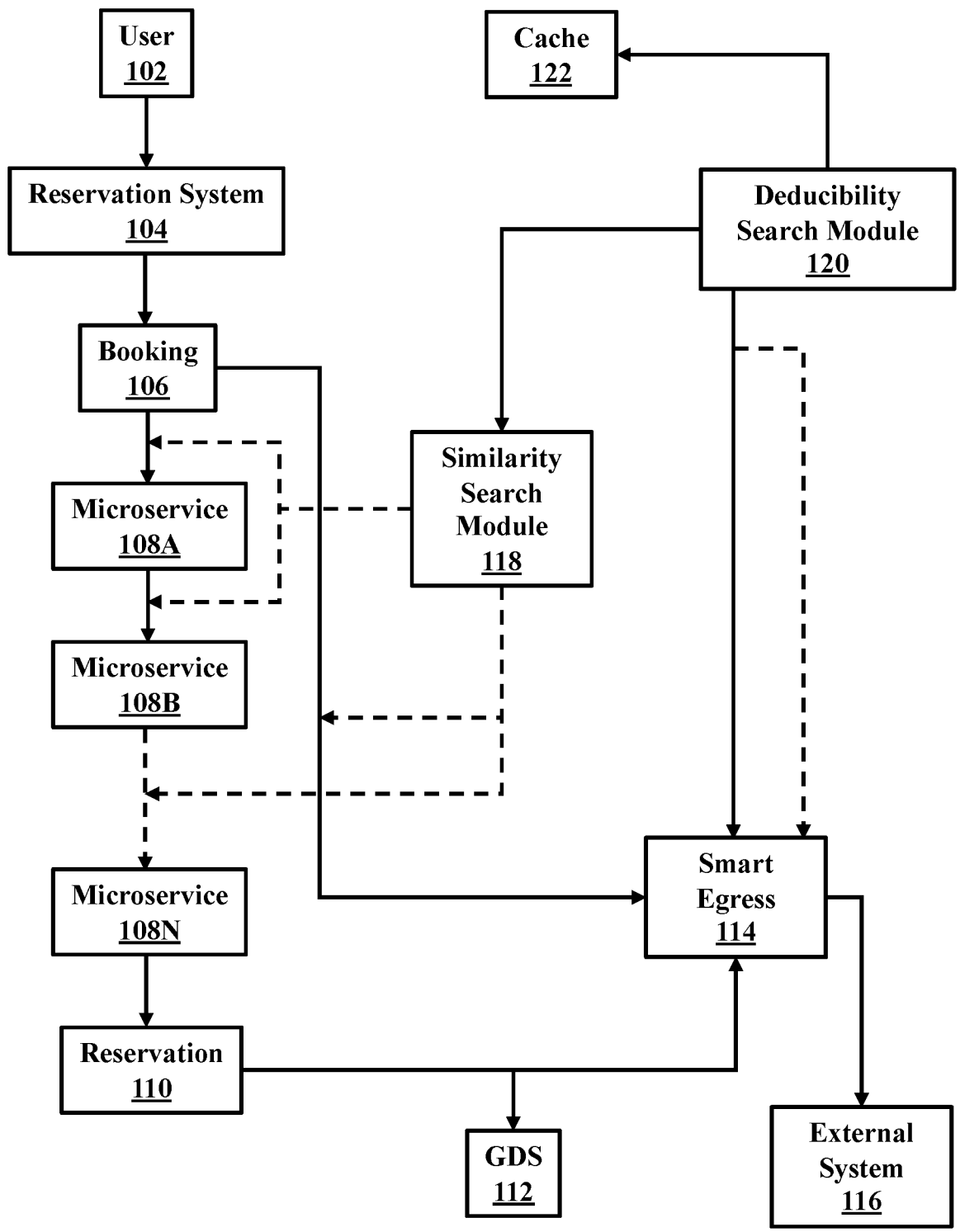
FIG. 1 illustrates a block diagram of an example system architecture for smart egress in service mesh, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of cloud-based solutions, and more specifically to smart egress in service mesh via deducibility cache built based on similarity searches within microservice chains. While the present disclosure is not necessarily limited to such applications, various aspects of the disclosure may be appreciated through a discussion of various examples using this context.

Microservice chains are one of the most evolving technical items in cloud-based solutions. A service mesh may be a form of a microservice chain in a controlled environment where each microservice in the chain has a proxy that can communicate with other microservices in the chain as well as with a control plane.

In some embodiments, a similarity search can be generalized as an approximate nearest neighbor search. In such an embodiment, a naive linear scan based similarity search algorithm may be of $O(N*D)_1, O(N*D)_2$ complexity, where $O(N*D)_1$ is a first running time (e.g., an amount of computer time it takes to run an algorithm), where N is cardinality (e.g., a measure of a number of elements of a set) of a first set (of microservices), and wherein D is a dimensionality (e.g., which level of linear space) of a space containing the first set; where $O(N*D)_2$ is a second running time, where N is cardinality of a second set (of microservices), and wherein D is a dimensionality of a space containing the second set. With such an algorithm, there are two ways to improve: 1) reducing the number of comparisons made and speeding up individual comparisons; and 2) partitioning data.

It is noted that the partition-based approach for improvement is one of the earliest methods to speed up a similarity search. Such a technique involves a branch and bound based search in the data space (e.g., "D"). In such an embodiment, the indexing structure is usually a tree data structure. Some of the common indexing techniques are:

1) a k-d tree, which is a binary space partitioning based data structure, where the data space is recursively divided by successive dimensions. A similar approach is a Quadtree, which partitions the space into four at every level. There are many other variants, with randomized KD-trees being the most recent scalable one;

2) an R–tree, which is an index technique that is well suited for neighbor search in a two-dimensional (2D) space. This indexing technique involves hierarchical overlapping rectangles. There are variants such as R+trees, R*trees, and X–trees; and 3) a metric tree, which is an indexing structure defined on metric spaces and which utilizes some properties like triangular inequality. A popular metric tree is an M–tree.

It is further noted that space partitioning techniques are, in general, not immune to the curse of dimensionality and when the dimensionality size increases beyond a certain point it worsens a linear scan.

Additionally, in some embodiments, in large systems there may be indirect relationships/associations between services, for example, a customer (e.g., user) might use a "hotel booking" or a "cab booking" service immediately after a "flight booking" service. Even though a "hotel" stay date may be something that may be related to "departure" and "arrival" flight dates . . . the "hotel booking" service (e.g., calling "hotel service providers") may be used sequentially (only) after the "flight booking" service. Thus, the user may lose their opportunity to book the best hotels, as well as a cloud provider may provide slower outcomes as the services are used sequentially.

Accordingly, proposed herein is a solution which can identify deducible information that may be used to trigger a different service/microservice parallelly (e.g., not sequentially) and cache outcomes (from the services) such that the sequential nature of processing can be reduced (e.g., thereby decreasing processing times and increasing processing efficiency).

Before turning to the FIGS., it may be beneficial to highlight the features of the proposed solution. For instance, in some embodiments, the proposed solution may identify microservices that may have deducible information by searching/analyzing possible microservices in a microservice chain for similar data in/of a chain of a microservice call in/of a single transaction. In some embodiments, based on an historical analysis, for each user profile, deducible relationships/associations between various microservices can be established.

In some embodiments, when same, or similar, user profiles try to execute a microservice in the microservice chain, possible deducible information (e.g., hotel stay dates, etc.) may be extracted and possible external service calls/egress (e.g., a call to a hotel reservation system) may be made and the outcome to the calls/egress may be cached. In some embodiments, the outcome may be cached just for the use within the same transaction.

In some embodiments, before executing the microservice with a deducibility relationship/deducible information, a service mesh may search the deducibility cache (e.g., cache with the outcome) and if an outcome associated with the microservice is identified as already within the cache, then the service mesh may not actually execute a call to external services, and the service mesh would retrieve the outcome (e.g., value) from the cache.

Referring now to FIG. 1, illustrated is a block diagram of an example system architecture 100 for smart egress in service mesh, in accordance with aspects of the present disclosure. As depicted, system architecture 100 includes a user 102, a reservation system 104, a booking (system) 106, microservices 108A-N, a reservation 110, a global distribution system (GDS) 112, a smart egress 114, an external system 116, a similarity search module 118, a deducibility search module 120, and a cache 122. In some embodiments, the smart egress 114 includes a deducibility caching mechanism (not depicted), which can identify deducible information and determine which outcomes are to be put into the cache 122. In some embodiments, the cache 122 can be referred to a deducibility cache.

Before turning to an in-depth example utilizing the components of FIG. 1, an overview of the system architecture 100 may be appreciated. Accordingly, in some embodiments, the system architecture 100 can be a multi-cloud service mesh based architecture, such as ISTIO®, but it is not limited to such an embodiments.

In some embodiments, a service mesh plane (e.g., not depicted) may be extended (e.g., over the reservation system 104, the booking 106, the microservices 108A-N, the reservation 110, the similarity search module 118, the cache 122, and/or the smart egress 114). The service mesh plane may be able to detect all the microservice chains (e.g., the aggregate of the microservices 108A-N) that a particular user profile associate with user 102 is participating in/accessing.

In some embodiments, the deducibility search module 120 may be established for all egress calls that are time consuming/consume a threshold amount of computing power, etc. In some embodiments, the deducibility search module 120 can establish egress calls based on a configuration by an administrator. In some embodiments, all such egress calls may be monitored (by the smart egress 114) and all input dimensions may be recorded per user profile.

In some embodiments, the deducibility search module 120 may search input dimensions and data send to each of the microservices 108A-N or between an of the various microservices 108A-N. The search could be based on fully developed similarity searches, or the search could be simple searches in JSONs, which are based on preidentified dimensions.

In some embodiments, once similar dimensions are identified, in an output of an earlier microservice, the deducibility search module 120 may establish one or more relationships/associations. The one or more relationships/associations may be established by multiple iterations of matches for various users (as based on the microservices 108A-N/service chains/etc. utilized by the user 102/user profile).

In some embodiments, once a relationship match with a match level above a match threshold is met (e.g., user 102 has used microservice 108A five times in the last two days, and a threshold of three times in two days indicates a likelihood that the user 102 will utilize microservice 108A again today), the deducibility search module 120 may start pre-executing such egress calls (from/associated with microservice 108A) even before a call lands on the actual microservice, e.g., thus relying on deduced values/outcomes for the egress calls.

In some embodiments, when the actual microservice (e.g., 108A) calls the egress, either the microservice 108A itself, or the deducibility search module 120, may check whether the cache 122 has results recorded for a same transaction associated with the microservice 108A, call of the microservice 108A, etc. If the cache 122 contains recorded results, an actual outbound call is not made, but values/outcomes associated with the call are picked up from the cache 122. This accordingly reduces the overall time required to complete actions within a complete service chain, as well as allows the user 102 to call external services (e.g., the external system 116) as early as possible.

Turning to an in-depth example associated with the system architecture 100 of FIG. 1. As depicted, the user 102 interacts with the reservation system 104 by booking 106 a flight and reserving (e.g., reservation 110) a hotel for travel. The booking 106 and reservation 110 are two different sets of microservices. The reservation system 104 has a chain of microservices 108A-N calls as shown, e.g., user input from user 102→reservation system 104→booking 106→microservice 108A→microservice 108B . . . →microservice 108N→reservation 110 (e.g., egress call).

In some embodiments, the reservation 110 might need to book dates (from and to), the deducibility search module 120 may then identify that the reservation 110 will take a few minutes to succeed (e.g., produce an outcome). The deducibility search module 120 may start to search data dimension in the following outputs of the microservices 108A-N, reservation system 104, the booking 106, etc. The deducibility search module 120 may find, based on utilization of the similarity search module 118 analysis, that 95% of instances of "from date," "to date," and "city" sent to reservation 110 are deducible from travel details sent to booking 106.

The deducibility search module 120, based on utilization of the similarity search module 118 analysis, may find/identify/determine that the dates sent to microservice 108A by booking 106 have a 100% match with the dates sent to reservation 110 by microservice 108N. The deducibility search module 120 may begin to intelligently set up the cache 122. In some embodiments, as soon as microservice 108A receives the dates as well as other details (e.g., city, destination, etc.) the deducibility search module 120 may send an egress external call via the smart egress 114 to the external system 116 (which may be associated with the reservation 110 of the hotel and pass through the GDS 112) and provide the results/output to the cache 122.

In such an embodiment, the smart egress 114 may access the cache 122 and find a matching output. The smart egress 114 may then not place an actual call to the external system 116 and may instead take the output from the cache 122. In some embodiments, a call to the external system 116 may take place if it is deduced that the call will take less time than retrieving the output from the cache 122.

Figure 2:
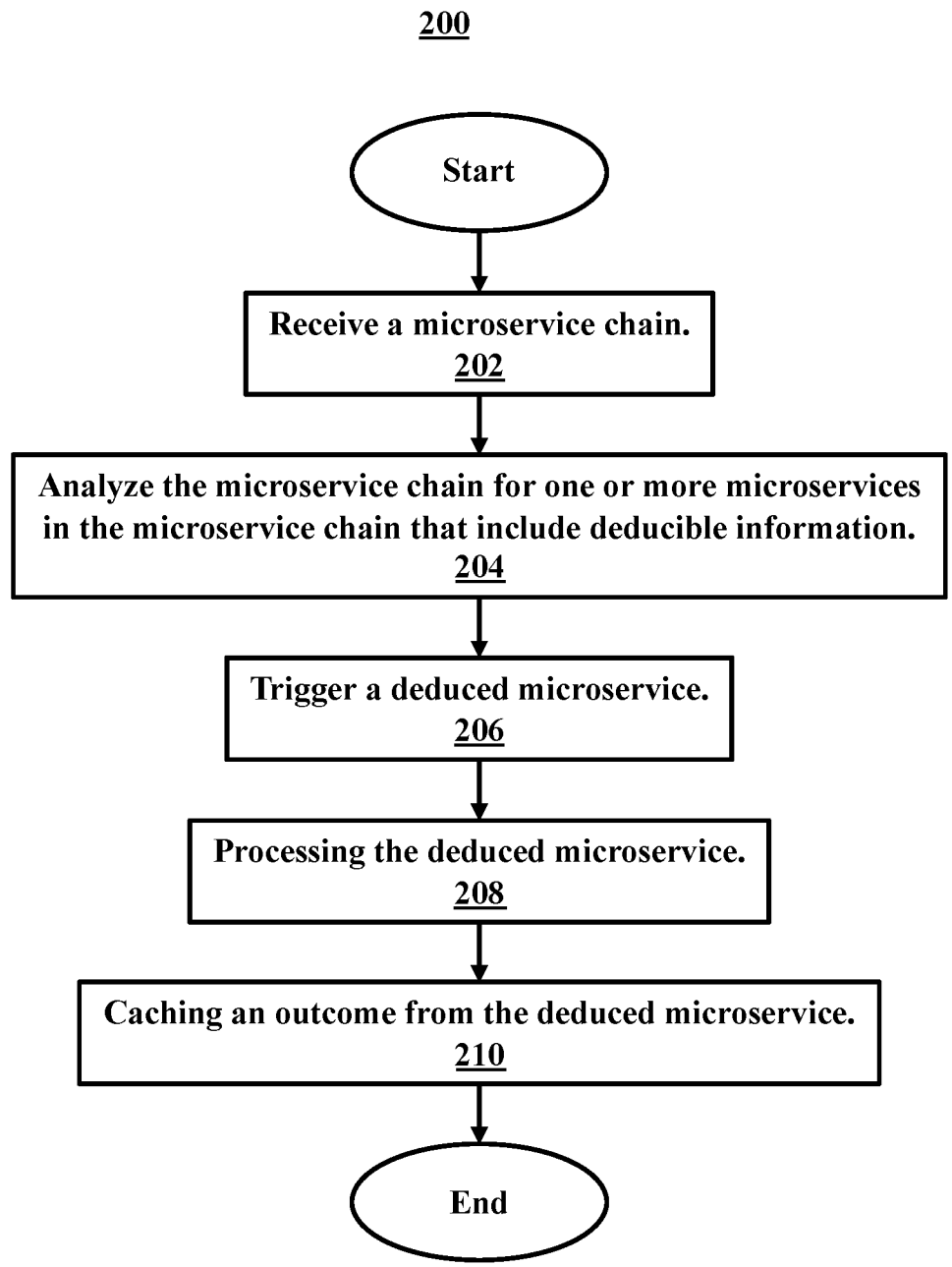
FIG. 2 illustrates a flowchart of an example method for smart egress in service mesh, in accordance with aspects of the present disclosure.

Referring now to FIG. 2, illustrated is a flowchart of an example method 200 for smart egress in service mesh, in accordance with aspects of the present disclosure. In some embodiments, the method 200 may be performed by a processor (e.g., of system architecture 100 of FIG. 1, etc.).

In some embodiments, the method 200 begins at operation 202, where the processor may receive/identify a microservice chain (e.g., based on an input/request from a user for a transaction, etc.). In some embodiments, the method 200 proceeds to operation 204, where the processor may analyze the microservice chain for one or more microservices in the microservice chain that include deducible information (e.g., information that may be used in subsequent microservices/calls in the microservice chain).

In some embodiments, the method 200 proceeds to operation 206, where the processor may trigger, from/based on the deducible information, a deduced microservice/microservice call (e.g., a subsequent microservice/call in the microservice chain which can have an output determined before its time in the microservice chain). In some embodiments, the method 200 proceeds to operation 208 where the processor may process the deduced microservice/microservice call.

In some embodiments, the method 200 proceeds to operation 210 where the processor may cache an outcome (e.g., value, values, etc.) from the deduce microservice. In some embodiments, the method 200 may end.

In some embodiments, discussed below, there are one or more operations of the method 200 not depicted for the sake of brevity and which are discussed throughout this disclosure. Accordingly, in some embodiments, the processor may process, in parallel (e.g., not sequentially), at least one of the one or more microservices simultaneous to processing the deduced microservice. In some embodiments, the processor may select a microservice in the microservice chain to provide the outcome as an input. The microservice may be selected based on the deducible information (e.g., a prior microservice/call with information [time, dates, etc.] may be selected and the deducible information may be used to generate an output for a subsequent microservice/call, etc.). The processor may provide the outcome as the input for the microservice in the microservice chain. The processor may generate a total outcome. The total outcome may be the outcome from the microservice. The processor may display the total outcome to a user (e.g., booked flights and confirmed hotel reservations, etc.).

In some embodiments, the processor may identify from a user profile associated with a user, deducible microservice chain. The user profile may include historical information associated with the microservice chain. The processor may detect that the user profile is trying to execute a microservice of the deducible microservice chain. For example, proposed solution, e.g., method 200, may deduce an output of one microservice as well as identify from a user profile a full microservice chain to be used to process a user request/input. For instance, a user may be a data processor that uses the same forms each day' the proposed solution could automate the form filling process by identifying select (e.g., deduced) information from the user's input and filling in a majority of the forms before they are actually in front of the user for review.

In some embodiments, the processor may extract, from the microservice, the deducible information. The processor may perform, based on the microservice, one or more external service calls. The processor may cache an external service call outcome. In some embodiments, the processor may identify a second deduced microservice. The processor may compare the second deduced microservice to the deduced microservice. The processor may determine that the second deduced microservice is associated with the deduced microservice (e.g., there is a similarity between the two deduced microservices, the similarity is within/above a threshold, etc.). The processor may provide the outcome from the deduced microservice as an outcome for the second deduced microservice (e.g., without triggering a call for the second deduced microservice).

In some embodiments, determining that the second deduced microservice is associated with the deduced microservice may include the processor identifying that the deduced microservice and the second microservice chare a common pool of external calls (e.g., and the pool is above a common threshold [greater than 50% of the calls are the same, etc.]).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
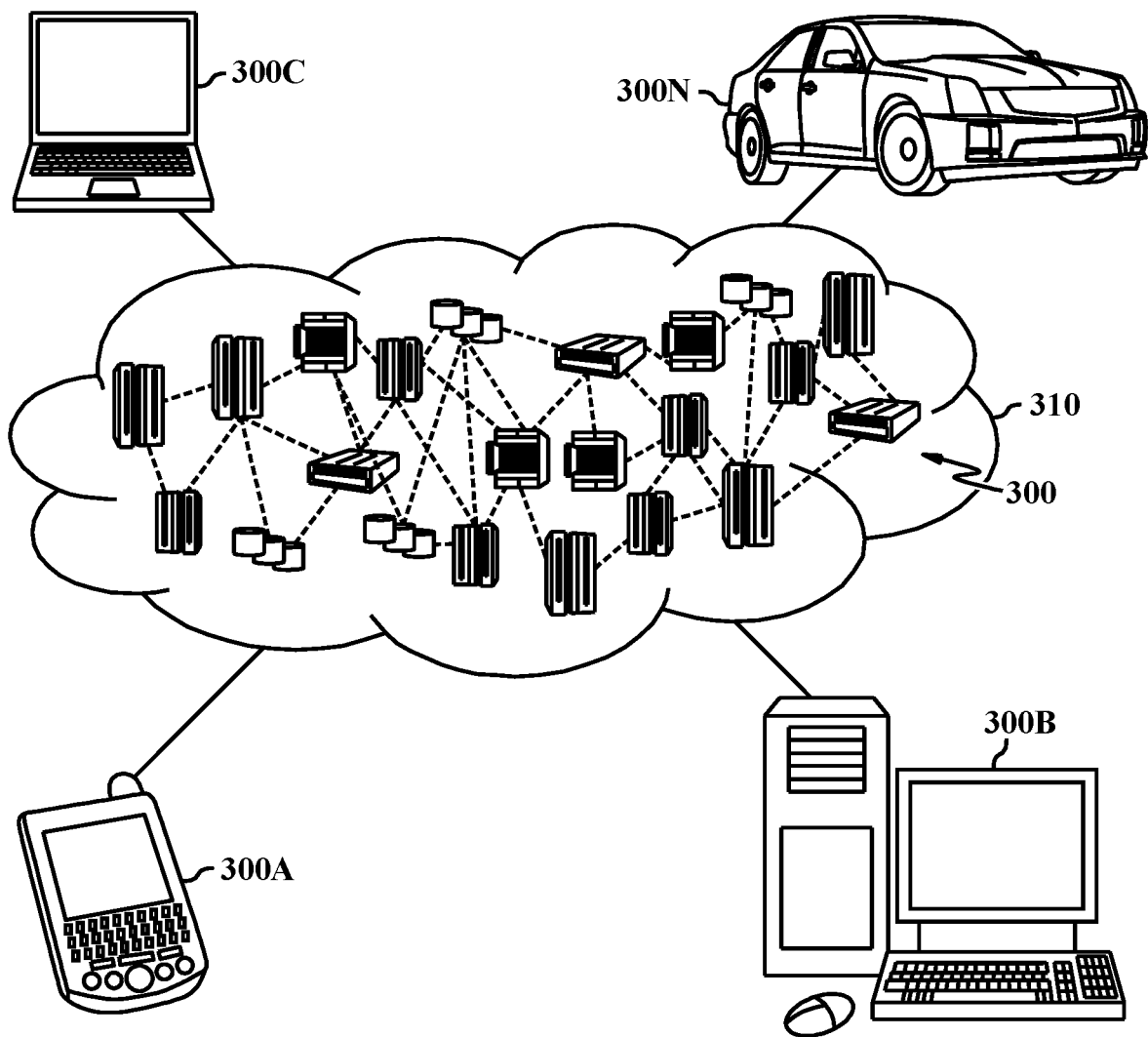
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
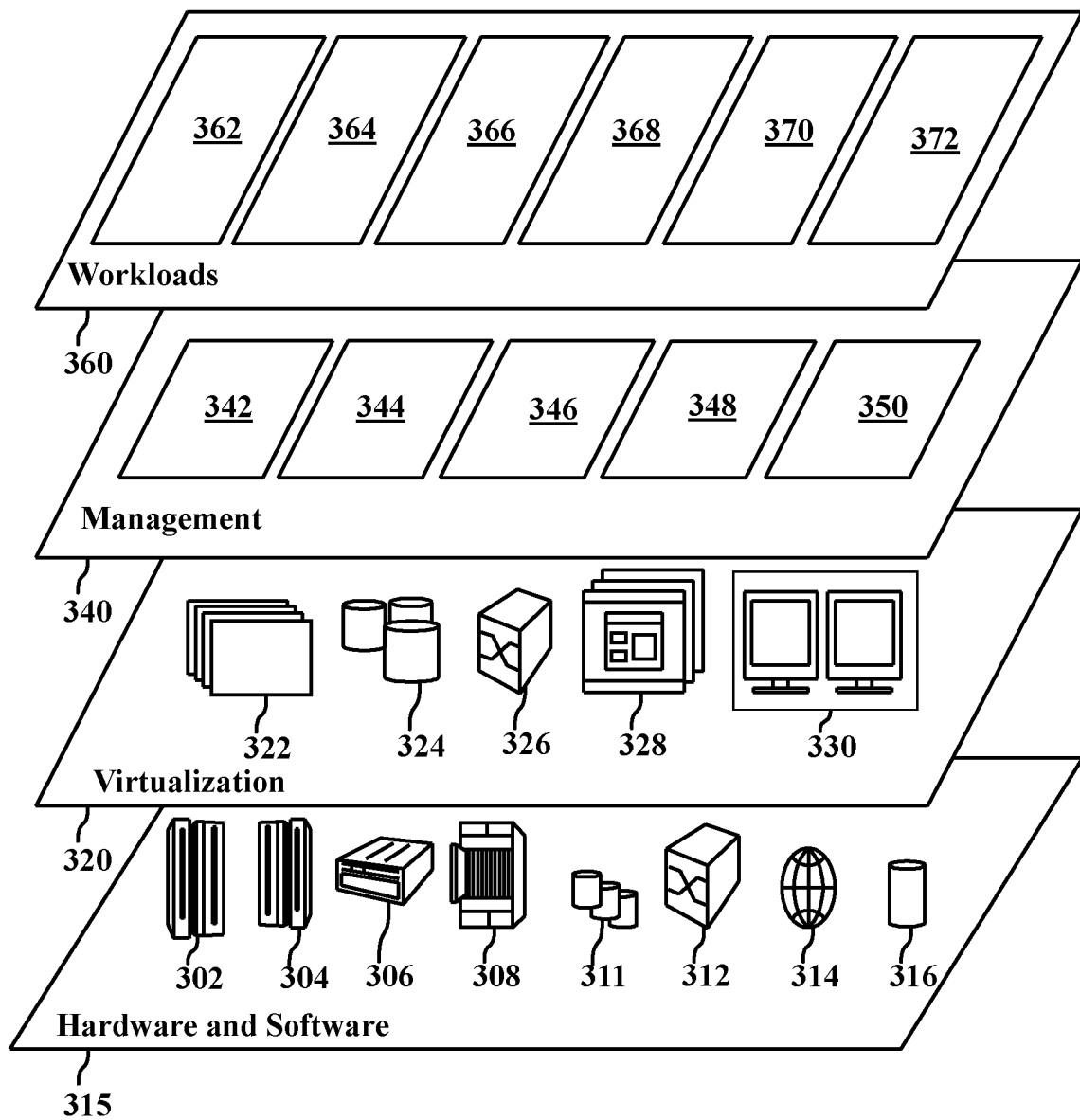
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and smart egress in service mesh 372.

Figure 4:
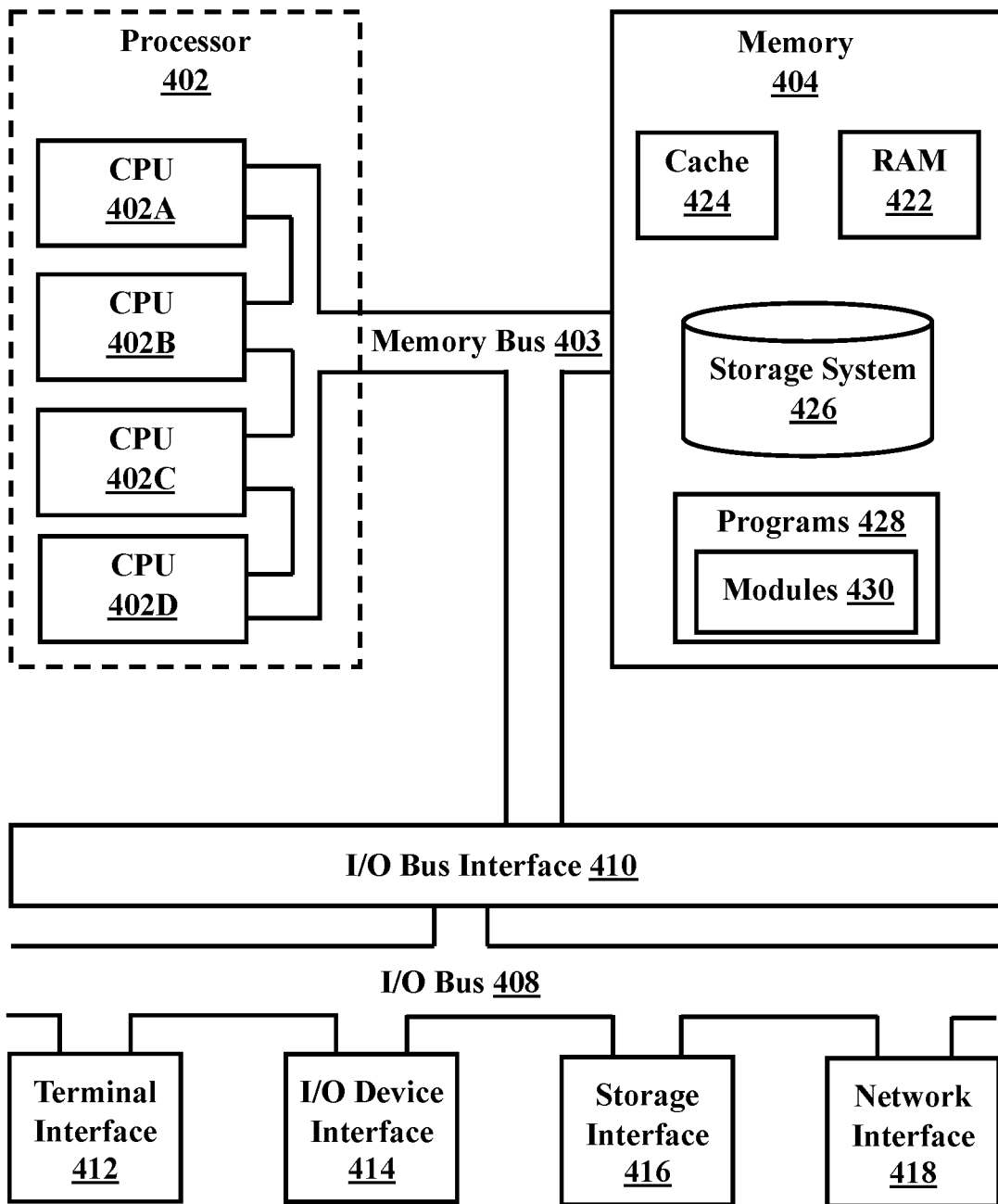
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A system for smart egress in service mesh, the system comprising:
    a memory; and
    a processor in communication with the memory, the processor being configured to perform operations comprising:
        receiving a microservice chain;
        analyzing the microservice chain for one or more microservices in the microservice chain that include deducible information;
        triggering, from the deducible information, a deduced microservice;
        processing the deduced microservice; and
        caching an outcome from the deduced microservice.

2. The system of claim 1, wherein the processor is further configured to perform operations comprising:
    processing, in parallel, at least one of the one or more microservices simultaneous to processing the deduced microservice.

3. The system of claim 2, wherein the processor is further configured to perform operations comprising:
    selecting a microservice in the microservice chain to provide the outcome as an input, wherein the microservice is selected based on the deducible information;

providing the outcome as the input for the microservice in the microservice chain;

generating a total outcome, wherein the total outcome is the outcome from the microservice; and displaying the total outcome to a user.

4. The system of claim 1, wherein the processor is further configured to perform operations comprising:

identifying from a user profile associated with a user, a deducible microservice chain, wherein the user profile includes historical information associated with the microservice chain; and detecting that the user profile is trying to execute a microservice of the deducible microservice chain.

5. The system of claim 4, wherein the processor is further configured to perform operations comprising:

extracting, from the microservice, the deducible information;

performing, based on the microservice, one or more external service calls; and caching an external service call outcome.

6. The system of claim 1, wherein the processor is further configured to perform operations comprising:

identifying a second deduced microservice;

comparing the second deduced microservice to the deduced microservice;

determining that the second deduced microservice is associated with the deduced microservice; and providing the outcome from the deduced microservice as an outcome for the second deduced microservice.

7. The system of claim 6, wherein determining that the second deduced microservice is associated with the deduced microservice includes:

identifying that the deduced microservice and the second deduced microservice share a common pool of external calls.

8. A computer-implemented method for smart egress in service mesh, the method comprising:

receiving, by a processor, a microservice chain;

analyzing the microservice chain for one or more microservices in the microservice chain that include deducible information;

triggering, from the deducible information, a deduced microservice;

processing the deduced microservice; and caching an outcome from the deduced microservice.

9. The computer-implemented method of claim 8, further comprising:

processing, in parallel, at least one of the one or more microservices simultaneous to processing the deduced microservice.

10. The computer-implemented method of claim 9, further comprising:

selecting a microservice in the microservice chain to provide the outcome as an input, wherein the microservice is selected based on the deducible information;

providing the outcome as the input for the microservice in the microservice chain;

generating a total outcome, wherein the total outcome is the outcome from the microservice; and displaying the total outcome to a user.

11. The computer-implemented method of claim 8, further comprising:

identifying from a user profile associated with a user, a deducible microservice chain, wherein the user profile includes historical information associated with the microservice chain; and detecting that the user profile is trying to execute a microservice of the deducible microservice chain.

12. The computer-implemented method of claim 11, further comprising:

extracting, from the microservice, the deducible information;

performing, based on the microservice, one or more external service calls; and caching an external service call outcome.

13. The computer-implemented method of claim 8, further comprising:

identifying a second deduced microservice;

comparing the second deduced microservice to the deduced microservice;

determining that the second deduced microservice is associated with the deduced microservice; and providing the outcome from the deduced microservice as an outcome for the second deduced microservice.

14. The computer-implemented method of claim 13, wherein determining that the second deduced microservice is associated with the deduced microservice includes:

identifying that the deduced microservice and the second deduced microservice share a common pool of external calls.

15. A computer program product for smart egress in service mesh comprising a computer readable storage medium having program instructions embodied therewith, the program instructions executable by a processor to cause the processor to perform operations, the operations comprising:

receiving a microservice chain;

analyzing the microservice chain for one or more microservices in the microservice chain that include deducible information;

triggering, from the deducible information, a deduced microservice;

processing the deduced microservice; and caching an outcome from the deduced microservice.

16. The computer program product of claim 15, wherein the processor is further configured to perform operations comprising:

processing, in parallel, at least one of the one or more microservices simultaneous to processing the deduced microservice.

17. The computer program product of claim 16, wherein the processor is further configured to perform operations comprising:

selecting a microservice in the microservice chain to provide the outcome as an input, wherein the microservice is selected based on the deducible information;

providing the outcome as the input for the microservice in the microservice chain;

generating a total outcome, wherein the total outcome is the outcome from the microservice; and displaying the total outcome to a user.

18. The computer program product of claim 15, wherein the processor is further configured to perform operations comprising:

identifying from a user profile associated with a user, a deducible microservice chain, wherein the user profile includes historical information associated with the microservice chain; and detecting that the user profile is trying to execute a microservice of the deducible microservice chain.

19. The computer program product of claim 18, wherein the processor is further configured to perform operations comprising:

extracting, from the microservice, the deducible information;

performing, based on the microservice, one or more external service calls; and caching an external service call outcome.

20. The computer program product of claim 15, wherein the processor is further configured to perform operations comprising:

identifying a second deduced microservice;

comparing the second deduced microservice to the deduced microservice; and determining that the second deduced microservice is associated with the deduced microservice, wherein determining that the second deduced microservice is associated with the deduced microservice includes:

identifying that the deduced microservice and the second deduced microservice share a common pool of external calls; and providing the outcome from the deduced microservice as an outcome for the second deduced microservice.

\* \* \* \* \*